United States Patent
Wang et al.

(10) Patent No.: US 9,629,195 B2
(45) Date of Patent: Apr. 18, 2017

(54) CONNECTION SWITCHING METHOD APPLICABLE TO REMOTE CONTROLLABLE SYSTEM AND MOBILE DEVICE, REMOTE CONTROLLABLE SYSTEM USING THE SAME, AND MOBILE DEVICE USING THE SAME

(71) Applicant: HTC Corporation, Taoyuan (TW)

(72) Inventors: Yuan-Kang Wang, Taoyuan (TW); Wen-Chuan Lee, Taoyuan (TW); Ko-Hsin Hsiang, Taoyuan (TW); Wen-Chien Liu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 14/724,836

(22) Filed: May 29, 2015

(65) Prior Publication Data

US 2015/0373769 A1 Dec. 24, 2015

Related U.S. Application Data

(60) Provisional application No. 62/014,694, filed on Jun. 20, 2014.

(51) Int. Cl.
| | |
|---|---|
| *H04M 3/00* | (2006.01) |
| *H04W 76/02* | (2009.01) |
| *G08C 17/02* | (2006.01) |
| *H04W 76/00* | (2009.01) |
| *H04W 4/00* | (2009.01) |
| *H04W 8/00* | (2009.01) |
| *H04W 84/18* | (2009.01) |
| *H04W 84/12* | (2009.01) |
| *H04W 92/18* | (2009.01) |

(52) U.S. Cl.
CPC .......... *H04W 76/026* (2013.01); *G08C 17/02* (2013.01); *H04W 4/008* (2013.01); *H04W 8/005* (2013.01); *H04W 76/00* (2013.01); *G08C 2201/93* (2013.01); *H04W 84/12* (2013.01); *H04W 84/18* (2013.01); *H04W 92/18* (2013.01)

(58) Field of Classification Search
CPC ... H04W 76/026; H04W 4/008; H04W 8/005; H04W 76/00; H04W 92/18; H04W 84/12; H04W 84/18; G08C 17/02; G08C 2201/93
USPC ........................................................ 455/419
See application file for complete search history.

(56) References Cited

U.S. PATENT DOCUMENTS

| | | | |
|---|---|---|---|
| 2010/0195539 A1* | 8/2010 | Tian ...................... | H04L 47/824 370/255 |
| 2011/0021140 A1* | 1/2011 | Binier .................. | H04B 5/0043 455/41.1 |

\* cited by examiner

*Primary Examiner* — Tanmay Shah
(74) *Attorney, Agent, or Firm* — Jianq Chyun IP Office

(57) ABSTRACT

The disclosure is directed to a remote access method and related devices using the same. In one of the exemplary embodiments, the method would include not limited to initiating a first connection between a first wireless interface of a first mobile device and a first wireless interface of a third mobile device; activating a first wireless access point by using a second wireless interface of a second mobile device; detecting the first wireless access point by using a second wireless interface of the third mobile device; disconnecting the first connection by the third mobile device in response to the first wireless access point being detected; and initiating a second connection between a first wireless interface of the second mobile device and a first wireless interface of the third mobile device.

21 Claims, 8 Drawing Sheets

CONNECTION SWITCHING METHOD APPLICABLE TO REMOTE CONTROLLABLE SYSTEM AND MOBILE DEVICE, REMOTE CONTROLLABLE SYSTEM USING THE SAME, AND MOBILE DEVICE USING THE SAME

CROSS REFERENCE TO RELATED APPLICATION

This application claims the priority benefit of U.S. provisional application Ser. No. 62/014,694, filed on Jun. 20, 2014. The entirety of the above-mentioned patent application is hereby incorporated by reference herein and made a part of specification.

TECHNICAL FIELD

The disclosure is directed to a connection switching method applicable to a remote controllable system and a mobile device, a remote controllable system using the same, and a mobile device using the same.

BACKGROUND

A miniature camera could be manufactured to be very small and light weight such that the camera could be embedded within a small contraption such as a person's glasses, pen, accessories, or inside of the person's clothing, suitcases, and so forth. An extremely miniaturized camera would likely be very small so that it would likely provide a very limited interface or no interface at all for receiving user controls. For example, this kind of camera might only have a power button such that the camera would need to rely on a remote access method to receive controls from a user.

A miniature camera could be paired with a modern mobile electronic device such as a smart phone, tablet, laptop, and smart watch since a mobile electronic device is also lightweight and portable and could be designed with the necessary sophistication to control a miniature camera through a wireless interface. However, using an electronic device to control a miniature camera would not be without problems. One design consideration could be related to the network interface used to facilitate communications between a mobile electronic device and a camera. Currently, the network interface available for a mobile device and a camera could be limited and may preclude other uses. Also, the communication between a mobile electronic device and a camera itself may consume a lot of energy. Moreover, the remote access method among multiple devices would need to be addressed in order for a miniature camera to be controllable by multiple mobile electronic devices.

In view of the aforementioned design concerns, various remote access methods and apparatuses using these methods could be implemented to address these concerns.

SUMMARY OF THE DISCLOSURE

Accordingly, the disclosure is directed to a connection switching method applicable to a remote controllable system and a mobile device, a remote controllable system using the same, and a mobile device using the same.

In one of the exemplary embodiments, the disclosure is directed to a connection switching method that is applicable to a remote controllable system comprising a first mobile device, a second mobile device, and a third mobile device which connects to the first mobile device or the second mobile device. The method would include not limited to initiating a first connection between a first wireless interface of the first mobile device and a first wireless interface of the third mobile device; activating a first wireless access point by using a second wireless interface of the second mobile device; detecting the first wireless access point by using a second wireless interface of the third mobile device; disconnecting the first connection by the third mobile device in response to the first wireless access point being detected; and initiating a second connection between a first wireless interface of the second mobile device and a first wireless interface of the third mobile device.

In one of the exemplary embodiments, the disclosure is directed to a connection switching method applicable to a first mobile device which connects to a second mobile device or a third mobile device. The method would include not limited to initiating a first connection over a first wireless interface and detecting for a first wireless access point by using a second wireless interface; disconnecting the first connection over the first wireless interface in response to the first wireless access point being detected; and initiating a second connection over the first wireless interface.

In one of the exemplary embodiments, the present disclosure is directed to a remote controllable system that includes not limited to a first mobile device; a second mobile device; and a third mobile device, wherein the remote controllable system is configured at least for: initiating a first connection between the first wireless interface of the first mobile device and the first wireless interface of the third mobile device; detecting a first wireless access point by using the second wireless interface of the third mobile device; disconnecting the first connection by the third mobile device in response to the first wireless access point being detected; and initiating a second connection between the first wireless interface of the second mobile device and the first wireless interface of the third mobile device.

In one of the exemplary embodiments, the present disclosure is directed to a first mobile device that includes not limited to a first wireless interface; a second wireless interface; and a processor coupled to the first wireless interface and the second wireless interface, wherein there processor is at least configured for: initiating a first connection over the first wireless interface and detecting for a first wireless access point by using the second wireless interface; disconnecting the first connection over the first wireless interface in response to the first wireless access point being detected; and initiating a second connection over the first wireless interface.

In order to make the aforementioned features and advantages of the present disclosure comprehensible, exemplary embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

Figure 1:
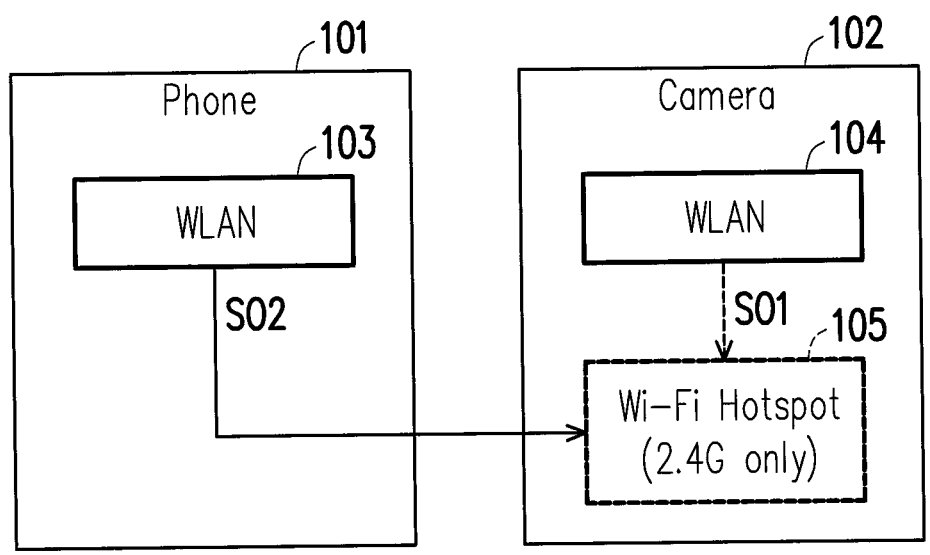
FIG. 1 illustrates a communication system between mobile electronic devices according to a first exemplary embodiment of the present disclosure.

Reference will now be made in detail to the present exemplary embodiments of the disclosure, examples of which are illustrated in the accompanying drawings. Wherever possible, the same reference numbers are used in the drawings and the description to refer to the same or like parts.

In order to facilitate connection switching between a mobile electronic device and a miniature camera, to reduce their power consumptions, and to address the issue of having multiple mobile electronic device attempting to simultaneously remote control a miniature camera, the disclosure proposes a connection switching method applicable to a remote controllable system, applicable to a mobile electronic device, and a remote controllable system using the same method and a mobile electronic device using the same method.

FIG. 1 illustrates a communication system 100 between a first mobile electronic device and a second mobile electronic device according to a first exemplary embodiment of the present disclosure. For exemplary purposes, the first mobile electronic device could be a smart phone 101, and the second mobile electronic device could be a digital camera 102; however, the present disclosure does not limit to these specific devices as the first mobile electronic device and the second mobile electronic device could also be any variation of mobile devices such as a personal digital assistant (PDA), a smart watch, a laptop, a tablet, a pager, a portable video gaming device, a musical device, a scanner, a printer, a camera, or the likes. The smart phone 101 would possess a wireless connection interface such as a wireless local area network (WLAN) interface 103, and the camera 102 would also possess a WLAN interface 104.

The WLAN interfaces 104 and 103 would each possess a wireless transceiver and connect to each via a Wi-Fi protocol according to the IEEE 802.11 standard or similar standards (e.g. IEEE 802.11x).

For the first exemplary embodiment, the smart phone 101 may connect to the camera 102 to perform remote access functions such as downloading multimedia contents from the camera 102, uploading to the camera 102, remote controlling the camera 102, remote viewing multimedia contents from the camera, and so forth. The aforementioned multimedia content may include still images, motion pictures, drawings, and so like. In order for the smart phone 101 to perform these functions, in step S01, the camera 102 may activate a Wi-Fi Hotspot 105 via the WLAN 104. In other words, the WLAN 104 of the camera 102 would serve as a Wi-Fi access point (AP) for the smart phone 101. Before connecting to the Wi-Fi Hotspot 105, the smart phone 101 may perform a passive scan and subsequently detect the Wi-Fi Hotspot 105. In step S02, the WLAN 103 would connect to the Wi-Fi Hotspot 105 served by the WLAN 104 of the camera 102. The connection between the smart phone 101 and the camera 102 will be complete after the necessary handshaking and authentication processes as required by the Wi-Fi protocol.

For the first exemplary embodiment, when the smart phone 101 connects to the camera 102 via Wi-Fi to perform remote access functions, the WLAN interface could be dedicated for the Wi-Fi connection between the smart phone 101 and the camera 102. By having the Wi-Fi connection dedicated for remote control between the smart phone 101 and the camera 102, the smart phone 101 would be unable to use the internet as long as the smart phone 101 is connected to the camera 102. Therefore, a smart phone could be required to use a 3G interface in order to access the internet. However, since many smart phones are configured to turn off the 3G interface when the WLAN interface is actively connected, the smart phone 101 might not be able to establish a data connection to the internet by using the 3G interface at all. Furthermore, if the smart phone 101 were a tablet instead, as a tablet is typically without a 3G interface, the tablet 101 would not be able to connect to the internet while the tablet 101 is still connected to the camera 102 in this case.

Moreover, the constant use of the Wi-Fi as an AP may consume a high amount of energy as it has been commonly experienced by consumers that when a mobile device such as a smart phone or laptop is used as a hotspot to share internet connections with friends, the battery of the mobile device could be very quickly drained. Therefore, while the first exemplary embodiment would accomplish remote access between two mobile electronic devices, a second exemplary embodiment would address the aforementioned issues with an approach that is described in the followings.

Figure 2A:
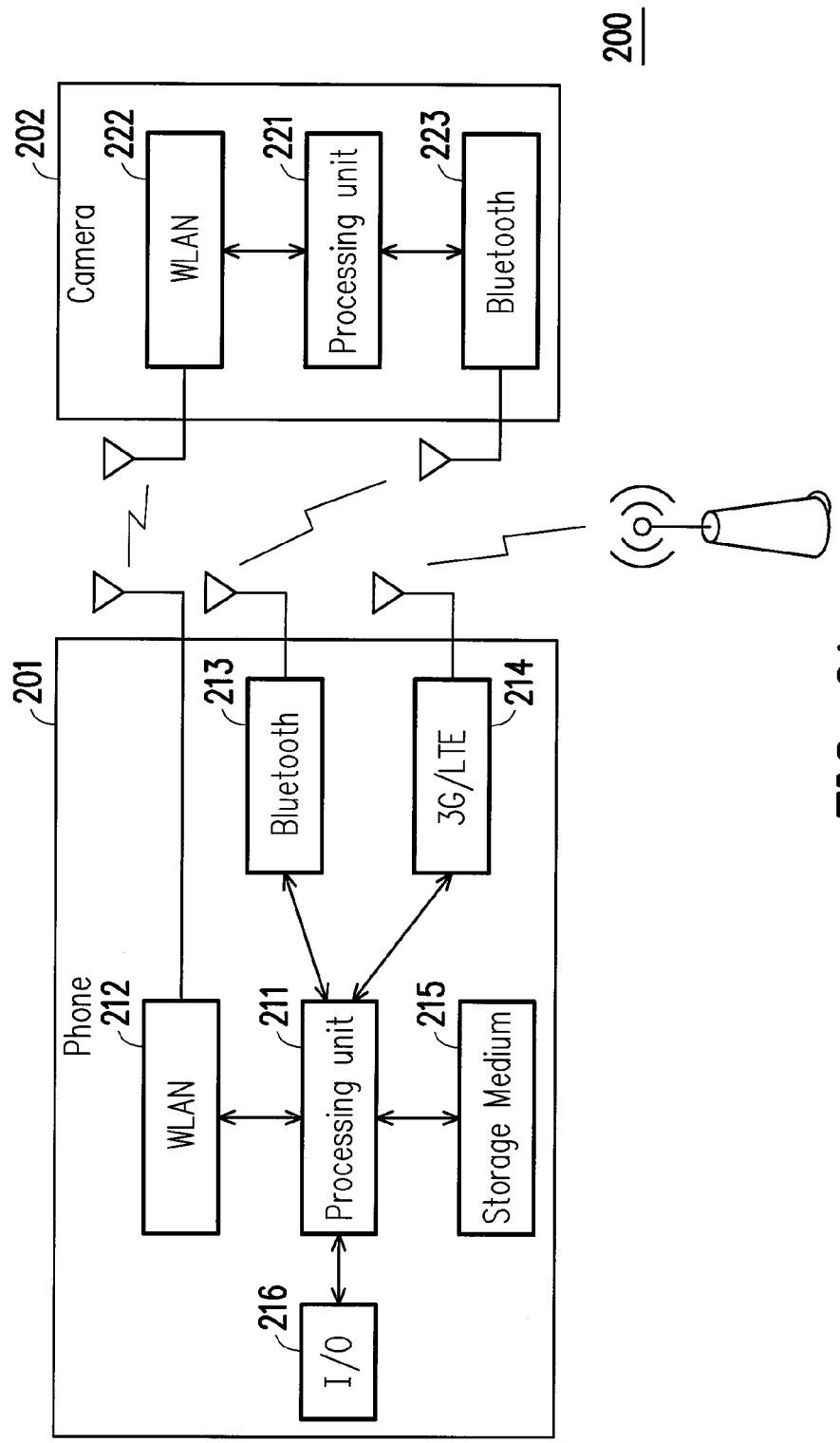
FIG. 2A illustrates a communication system between mobile electronic devices in terms of hardware diagrams according to a second exemplary embodiment of the present disclosure.

FIG. 2A illustrates a communication system 200 between a first electronic device 201 and a second electronic device 202 in terms of hardware diagrams according to a second exemplary embodiment of the present disclosure. The communication system 200 would include the first electronic device 201 communicating with the second electronic device 202 through different and multiple wireless interfaces. The first electronic device 201 could be assumed to control the second electronic device 202. However, the disclosure does not preclude the possibility of the second electronic device 202 controlling the first electronic device 201. For exemplary purpose, the first electronic device could be a smart phone 201, and the second electronic device could be a digital camera 202; however, the present disclosure is also not limited to these two particular devices as the variation of mobile devices described for the first embodiment would also apply for the second embodiment. The smart phone 201 would contain at least but not limited to a processing unit 211 that is electrically connected to a WLAN interface 212, a Bluetooth or Bluetooth low energy (BLE) interface 213, an optional third generation (3G) or Long Term Evolution (LTE) wireless interface 214, a non-transitory storage medium 215, and a Input/Output interface 216 such as buttons or a touch panel with a display screen. The camera 202 would contain at least but not limited to a processing unit 221, a WLAN 222, and a Bluetooth or BLE interface 223.

It should be noted that for the second exemplary embodiment, the camera 202 may have a very limited or a very simple input/output interface or none at all. In other words, in one exemplary embodiment, the camera 202 may not actually have a display for a user to browse through multimedia contents, nor would the camera 202 possess a keyboard to enter user inputs. For example, the camera 202 could be very small and light weight such that the camera 202 could be embedded on a person's glasses, clothing, or accessories. In another exemplary embodiment, the camera 202 may have a very small display and a very limited mean of user inputs such that a user would need to rely on an alien device such as the smart phone 201 to browse through and to edit multimedia contents. Therefore, for the second exemplary embodiment, as the camera 202 is very likely to offer a limited interface for its user, the viewing and editing functions would need to be performed by another mobile electronic device such as the smart phone 201 by proxy.

Figure 2B:
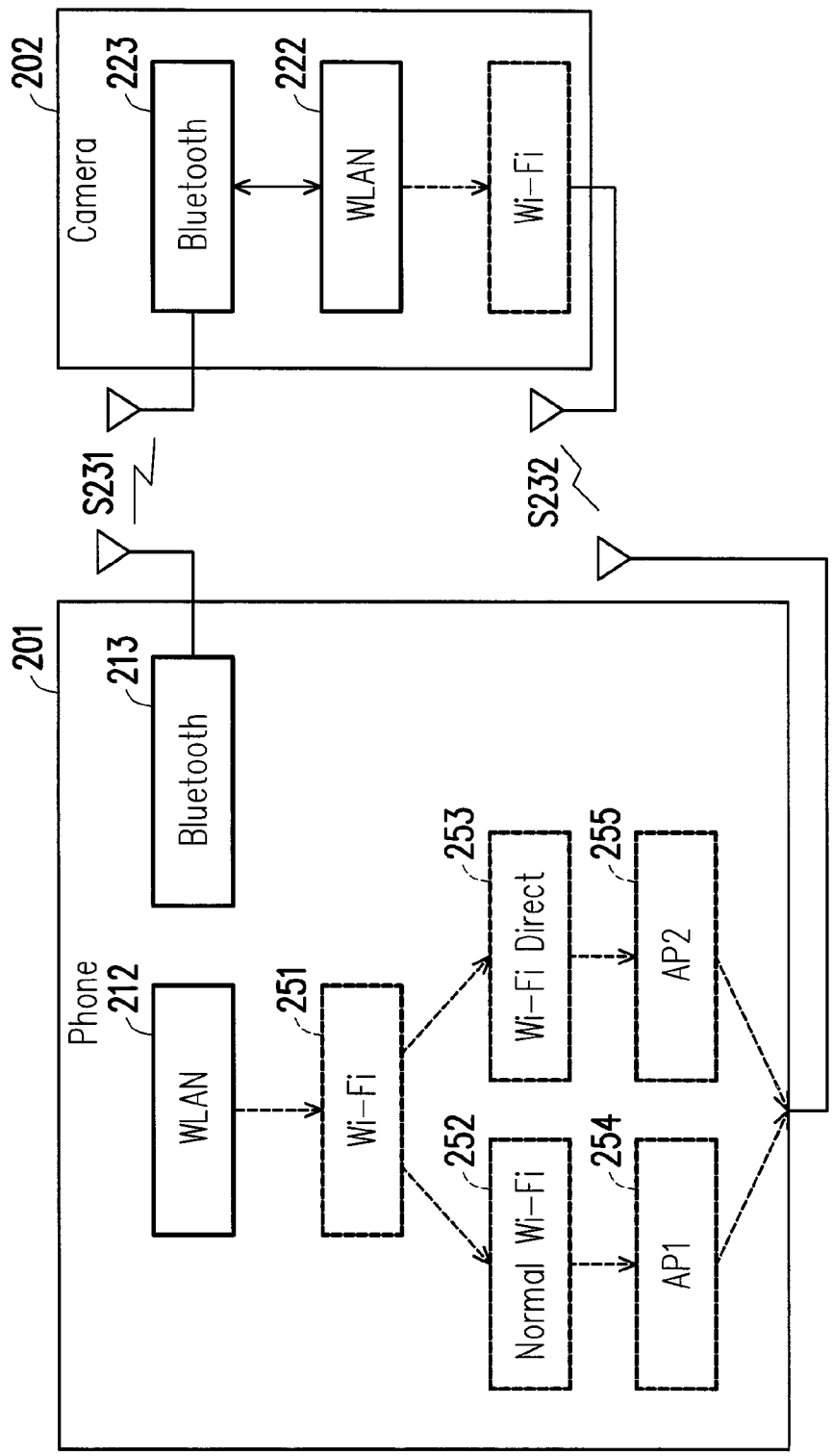
FIG. 2B illustrates a connection switching method between mobile electronic devices according to the second exemplary embodiment of the present disclosure.

FIG. 2B illustrates a remote access method between mobile electronic devices according to the second exemplary embodiment of the present disclosure. For this exemplary embodiment, both the WLAN 212 interface and the Bluetooth 213 interface will be utilized by the smart phone 201 to accomplish remote access purposes. The camera 202 would also have a WLAN interface 222 and a Bluetooth interface 223 to connect with the WLAN interface 212 and the Bluetooth interface 213 of the smart phone 201 respectively. The Bluetooth 213 interface would be a hardware interface including wireless a transceiver to implement a version of the Bluetooth protocols such as Bluetooth version 4.0 that includes Bluetooth low energy (BLE), Bluetooth high speed, and Classic Bluetooth.

For the second exemplary embodiment, one feature that is different from the first exemplary embodiment is the use of a Bluetooth interface which would be utilized to perform discovery, handshaking, and authentication processes. Another feature that is different from the first exemplary embodiment is that the smart phone 201 would serve as an AP instead of the camera 202. Upon the completion of the authentication processes via the Bluetooth interfaces 213 223, the camera 202 would be authenticated to use the AP and thus two way communications using a Wi-Fi protocol over the WLAN interfaces 212 222 (i.e. a Wi-Fi connection as in S232) could commence. Therefore, as the smart phone 201 may perform remote access functions via the WLAN interfaces 212 222, the Bluetooth connection (S231) may still be maintained. The Bluetooth connection (S231) may serve to relay signals not directly related to remote access functions. For example, any errors were to occur while the smart phone 201 is downloading a multimedia content from the camera 202, the error signal could be transmitted over the Bluetooth connection (S231). By delegating transmissions not directly related to remote access functions to the Bluetooth connection (S231), energy consumption could be reduced as a Bluetooth connection (S231) generally consumes less energy than a Wi-Fi connection (S232). The signals not directly related to remote access functions could include, for example, control signaling that are inherent to the Bluetooth interface.

The use of the Bluetooth connection (S231) is to be described in further detail. For this exemplary embodiment, the discovery process may involve the smart phone first activating the Bluetooth interface 213. Upon activation, the Bluetooth interface 213 may attempt to discover a nearby device by scanning for nearby devices also having their Bluetooth interfaces activated. Upon scanning for a neighboring device as a candidate for connection, besides locating the camera 202, other Bluetooth devices such as an earphone, a keyboard, a mouse, and so likes could also be found. The smart phone 201 may then filter other Bluetooth devices to in order to discover the camera 202 as the proper candidate for connection by their media access control (MAC) addresses. Afterwards, the Bluetooth interface 213 may transmit a handshaking or a discovery signal via the transceiver of the Bluetooth interface 213. Upon receiving the handshaking signal, the transceiver of the Bluetooth interface 223 of the camera 202 may transmit a handshaking acknowledgment back to the smart phone 201 to inform the smart phone 201 the existence of the camera 202. In response to receiving the handshaking acknowledgment from the camera, the smart phone 201 would commence the authentication process for the purpose of authenticating the camera 202 to use the Wi-Fi AP provided by the smart phone 201. The authentication process would involve the smart phone 201 transmitting to the camera 202 the authentication information over the Bluetooth connection (S231).

The authentication may include at least one of (1) security type information, (2) identification information of the smart phone 201, and (3) a password to be used for authentication. The identification information of the smart phone 201 may include at least one of a basic service set identification (BSSID) and a service set identification (SSID). In response to receiving the authentication information, the camera 202 may send an authentication transmission to the smart phone 201 by transmitting the received identification information and the password over the Wi-Fi connection (S232) to be authorized. The authentication transmission could be encrypted based on the security type information received from the smart phone 201. In response to receiving the authentication transmission from the camera 202, the smart phone 201 would complete the handshaking and authentication process and may start performing remote access functions.

One of the purposes of having the smart phone 201 to send the authentication information to the camera 202 is that the camera 202 has very limited user interfaces so that a person would be hard pressed or completely unable to enter a password without a keyboard or a sufficient number of buttons. Therefore, the phone 201 would instead instruct the camera 202 for how to complete the authentication process by sending the authentication information to the camera 202 instead of having a user to enter the authentication information manually. Also by delegating the tasks related to the handshaking and authentication to the Bluetooth interfaces 213 223 instead of WLAN interfaces 212 222, energy consumption is reduced. In general, a Bluetooth interface would consume less energy than a WLAN interface, especially if BLE is utilized.

The Wi-Fi connection (S232) is to be described in further detail. After the discovery, handshaking, and authentication process is completed, the remote access function would be accomplished through the two-way communications between the WLAN interface 212 of the smart phone 201 and the WLAN interface 222 of the camera 202. In other words, the smart phone 201 would be able to perform functions via the WLAN interfaces 212 222 such as downloading pictures or videos from the camera 202, deleting pictures or videos stored in the camera 202, changing user preferences of the camera 202, applying a different digital filter or effect of the camera 202, and so forth.

The WLAN 212 interface could be a dual band hardware transceiver that is configured as a Wi-Fi protocol 251 operating in both the 2.4 GHz spectrum and the 5 GHz spectrum according to a version of the IEEE 802.11 standards. In comparison to the 2.4 GHz spectrum, the 5 GHz spectrum is less crowded in the airwave and has a higher bandwidth with more channels. Wi-Fi operating in 5 GHz spectrum would experience less interference from other airwave transmitters in comparison to Wi-Fi operating under 2.4 GHz spectrum, and therefore the smart phone 201 and camera 202 may exchange Wi-Fi capability via the BLE. If both the smart phone 201 and the camera 202 would support 5 GHz, they may establish the Wi-Fi connection in the 5 GHz spectrum by default so as to secure better transmission throughput. In order to retain internet connection while connected to the camera 202, the Wi-Fi protocol 251 would be configured to multiplex between a normal Wi-Fi mode 252 and a Wi-Fi direct mode 253. In general, the Wi-Fi direct mode 253 would allow a peer to peer connection between two electronic devices without requiring either device to connect to a router that relays data in between the two electronic devices.

The normal Wi-Fi mode 252 would offer a first access point (AP1) which serves as an ordinary hotspot and may provide a mean to connect to the internet. The Wi-Fi Direct mode 253 would offer a second access point (AP2) which would allow the WLAN interface 222 of the camera 202 to connect to the WLAN interface 212 of the smart phone 201. The AP1 could be thought of as a channel that provides an internet connection, and AP2 could be thought of as a channel that provides an intranet connection. By multiplexing between the normal Wi-Fi mode 252 and the Wi-Fi Direct 253 mode, the smart phone 201 would still be able to access the internet while the smart phone 201 is performing remote access functions with the camera 202. Furthermore, the Wi-Fi Direct mode 253 would only be activated as needed. This means that when the smart phone 201 is intending to connect to the camera 202, the AP2 would be provided to the WLAN interface 222 of the camera 202 for connection. When the smart phone 202 does not intend to connect to the camera 202, the AP2 would not be activated. In this way, energy consumptions would also be reduced.

Figure 2C:
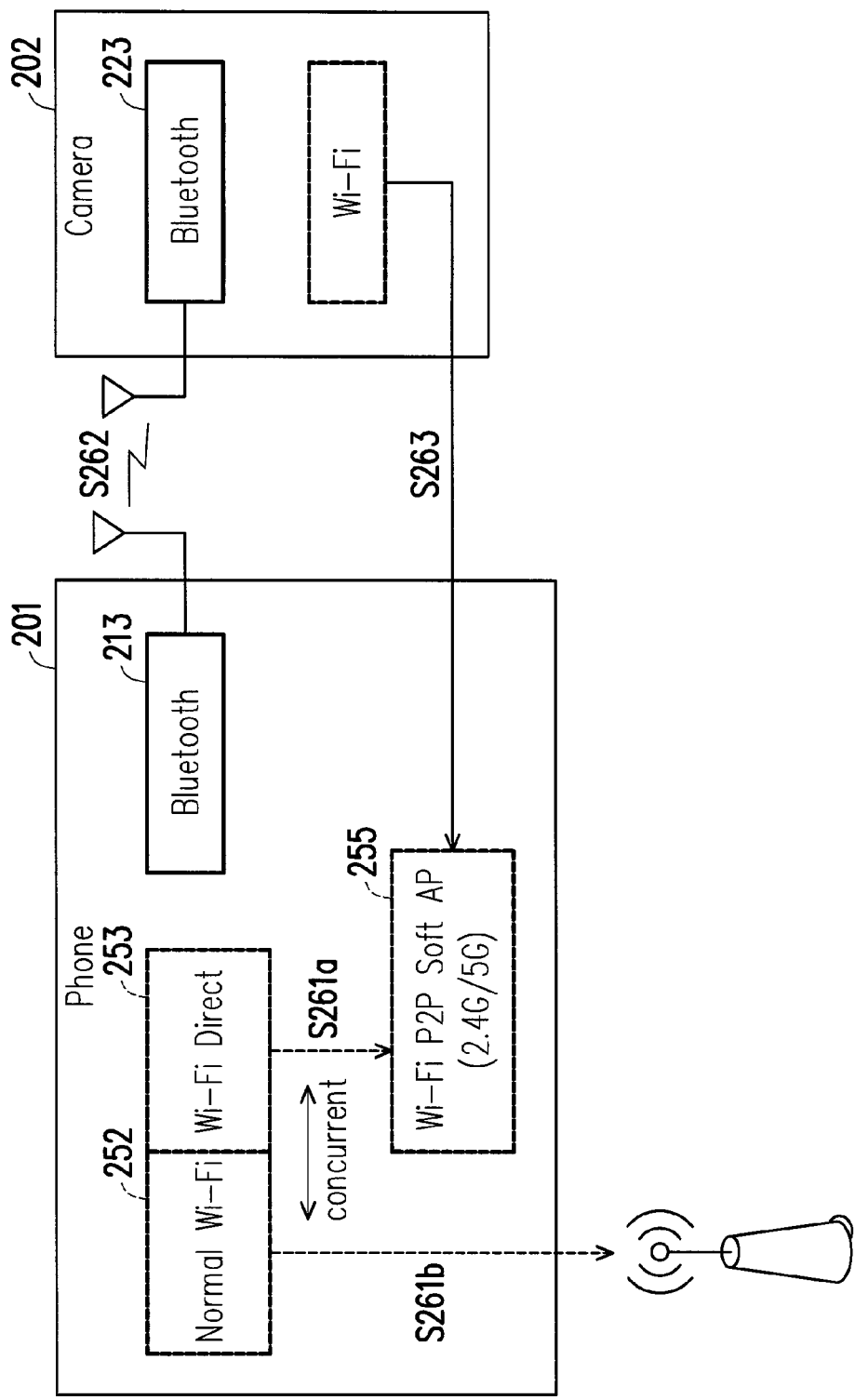
FIG. 2C illustrates the connection switching method between mobile electronic devices according to the second exemplary embodiment of the present disclosure.

FIG. 2C provides an example of the remote access method between mobile electronic devices with more specific details according to the second exemplary embodiment of the present disclosure. In step S261a, a Wi-Fi peer to peer (P2P) software AP 255 would be activated to execute the Wi-Fi Direct protocol 253. By activating the Wi-Fi P2P software AP 255, the smart phone 201 intends to connect to the camera 202. In step S261b, the normal Wi-Fi 252 may also connect to a small base station to access the internet. The small base station could be but not limited to a femto-base station or a home base station such as a router or a modem that provides an internet connection. The normal Wi-Fi 252 and the Wi-Fi Direct 253 could be operating concurrently meaning that a normal Wi-Fi connection and a Wi-Fi Direct connection could both be active and maintained at the same time without requiring to cut off one of the two connections.

In step S262, the smart phone 201 would execute a discovery, handshaking, and authentication process. In particular, during the authentication process, the smart phone 201 may transmit a password to be used by the camera 202 as well as a SSID of smart phone 201 to the camera 201 through the Bluetooth interface 213. Upon receiving the password and the SSID of the smart phone 201, in step S263, the authentication process may commence as the camera 202 would attempt a login for the Wi-Fi P2P software AP 255 by entering the password and the SSID received from the smart phone. When the authentication process is successful, the camera 202 would establish a Wi-Fi connection with the smart phone 201 by connecting to the Wi-Fi P2P software AP 255 of the smart phone 201. After step S263 has been complete, the smart phone 201 may perform remote access to the camera 202.

The second embodiment would include not only providing the feasibility of internet connections while a peer to peer connection is still active but also reducing power consumptions by delegating tasks not directly related to the remote access functions to the Bluetooth interface.

Figure 3:
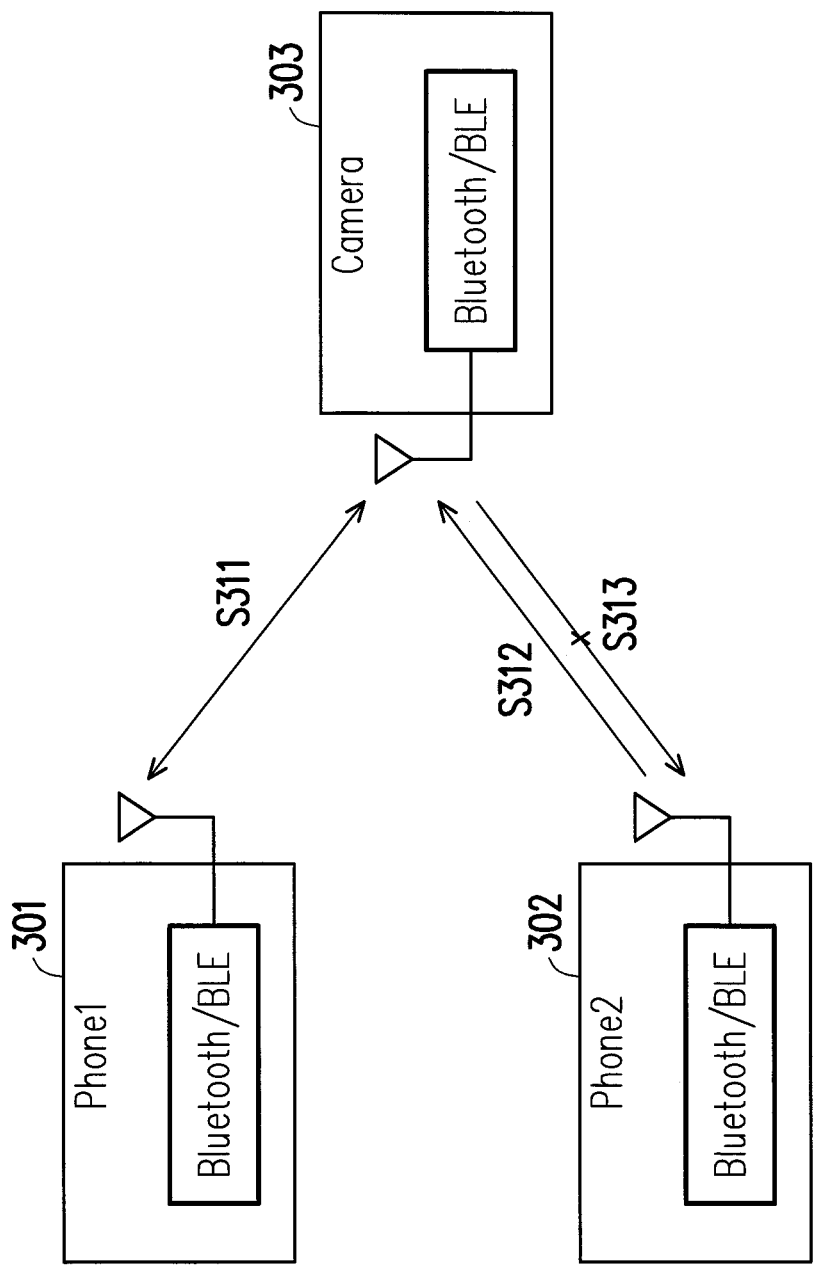
FIG. 3 illustrates the connection switching method among three mobile electronic devices according to a third exemplary embodiment of the present disclosure.

As for handling multiple connections, the remote access method of the present disclosure could extend to a device serving multiple electronic mobile devices which may seek to perform remote access to the device. FIG. 3 illustrates the remote access method among three mobile electronic devices according to a third exemplary embodiment of the present disclosure. For this exemplary embodiment, for example, both a first mobile electronic device such as a first smart phone 301 and a second mobile electronic device such as a second smart phone 302 would seek to access a third electronic device which could be a digital camera 303 remotely. Without a remote access method in place, a contention situation might arise between both the first smart phone 301 and the second smart phone 302 as both the first smart phone 301 and the second smart phone 302 may try to connect to the camera 303 and cause interferences. For example, if the second smart phone 302 that intends to use the camera 303 has a higher priority than the first smart phone 301, the Bluetooth connection between the first smart phone 301 and the camera 303 to exchange background signaling data would prevent the second smart phone 302 from accessing the camera 303.

For example, in step S311, the first smart phone 301 is connected to the camera 303 for remote access. In step S312, the second smart phone 302 seeks to remote access the camera 303. However, since the first smart phone 301 is still connected to the camera, in step S313 the camera 303 would not respond to the handshaking of the second smart phone 302 while the camera 303 is still connected from the first smart phone 301. In other words, in step S313, the second smart phone 302 may be able to remote access the camera 303 only if the camera 303 is disconnected from the first smart phone 301. In this way, the second smart phone 302 might not be able to connect to the camera 303 at all while the first smart phone 301 is still connected to the camera 303. In some cases, the first smart phone 301 might not actually be accessing the camera 303 remotely and is therefore sitting idle. However, the second camera 302 would not be able to access the camera 303 remotely until the connection between the first smart phone 301 and the camera 303 has been cut-off. Therefore, an alternative embodiment could be proposed to allow the second smart phone 302 to connect to the camera 303 without waiting for the first smart phone 301 to cut-off its connection with the camera 303.

Figure 4:
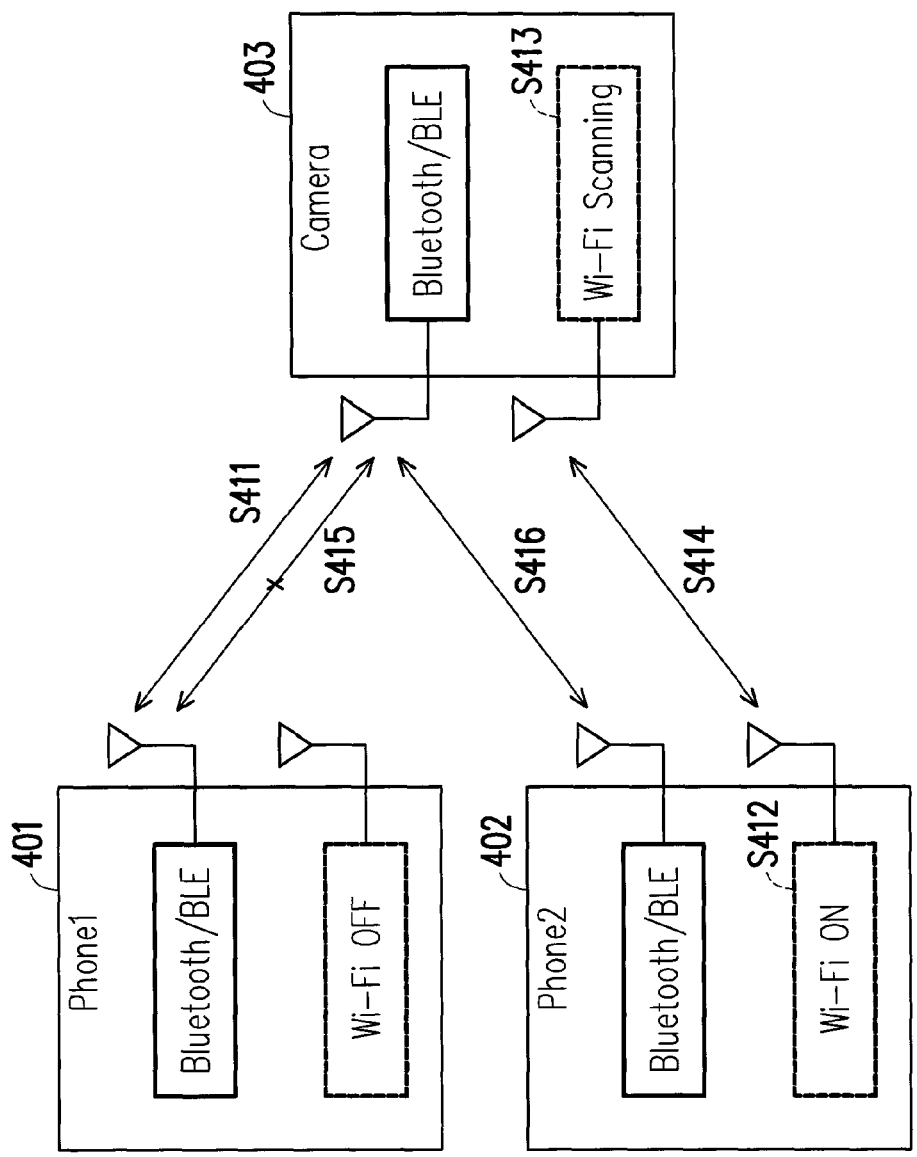
FIG. 4 illustrates the connection switching method among three or more mobile electronic devices according to a fourth exemplary embodiment of the present disclosure.

FIG. 4 illustrates the remote access method among three or more mobile electronic devices according to the fourth exemplary embodiment of the present disclosure. The scenario of FIG. 4 is similar to FIG. 3 as both a first smart phone 401 and a second smart phone 402 seeks to remote access a digital camera 403. The detailed mechanism of interaction between the first smart phone 401 and the camera 403 and also between the second smart phone 402 and the camera 403 would be consistent with the remote access method disclosed by FIG. 1 and FIG. 2A ~FIG. 2C and their corresponding written descriptions and thus a repetition of the disclosure would not be necessary. For this exemplary embodiment, the camera 403 is also assumed to either lack a user interface completely or possess a very simple user interface so that the camera 403 would need to be accessed by an alien device remotely.

In step S411, a Bluetooth connection has been established and is maintained between the first smart phone 401 and the camera 403. In step S412, the second smart phone 402 has initiated a connection to the camera 403 by turning on its Wi-Fi P2P software AP. In step S413, after having the Bluetooth connection between the first smart phone 401 and the camera 403, the camera 403 may initiate a passive Wi-Fi scan. It should be noted that the camera 403 may perform the passive Wi-Fi scan only if no active transmission occurs between the first smart phone 401 and the camera 403. In other words, the camera 403 may perform the passive Wi-Fi scan only if the first smart phone 401 is not actively accessing the camera 403 remotely. This may help to conserve power. In step S414, the camera 403 is assumed to have detected the Wi-Fi beacon signal emitted from the second smart phone 402. In step S415, the camera 403 would disconnect the Bluetooth connection with the first smart phone 401. In step S416, the camera 403 would initiate a Bluetooth connection with the second smart phone 402. Upon the completion of the discovery, handshaking, and authentication processes which are similar to the aforementioned second exemplary embodiment, the second smart phone 402 would be able to perform remote access functions with the camera 403.

In one exemplary embodiment, steps S415 and S416 would be performed only if the discovery, handshaking, and authentication processes have been completed between the camera 403 and the second smartphone 402 before. In this way, if the camera 403 has detected an unfamiliar mobile device during the passive Wi-Fi scanning in step S413, the camera 403 would not cut-off its Bluetooth connection so that a Bluetooth connection between two familiar devices would not be continuously disrupted whenever a Wi-Fi beacon signal of an unfamiliar device is detected. A device being familiar with another device refers to the circumstance in which one device either has connected to another device previously or has known the existence of another device. For example, if the camera 403 has ever connected to the AP of the smart phone 402, the camera 403 may have recorded the SSID of the AP of the smart phone 402 such that the camera 403 would be familiar with the smart phone 402. Otherwise, the camera 403 may not be familiar with the smart phone 402 such that the camera 403 and the smart phone 402 could be considered to be unfamiliar with each other.

It should be apparent to one skilled in the art that the disclosure provided by FIG. 4 and its written description can extend to more than two devices that try to control the camera remotely. In principle, in response to step S413, the camera 403 would connect to a software P2P AP of an electronic device that has already been connected to the camera 402 previously. If multiple electronic devices which all have established connection with the camera 403 previously try to contend for remote accesses to the camera 403, in response to step S413, the camera 403 would connect to the electronic device that has first turned on the software P2P AP. However, when the camera 403 detects more one or more other electronic devices besides the smart phone 402 which all have connected to the camera 403 previously and try to remote access the camera 403, the camera 403 may connect to the electronic device that has last connected to camera 403.

Figure 5:
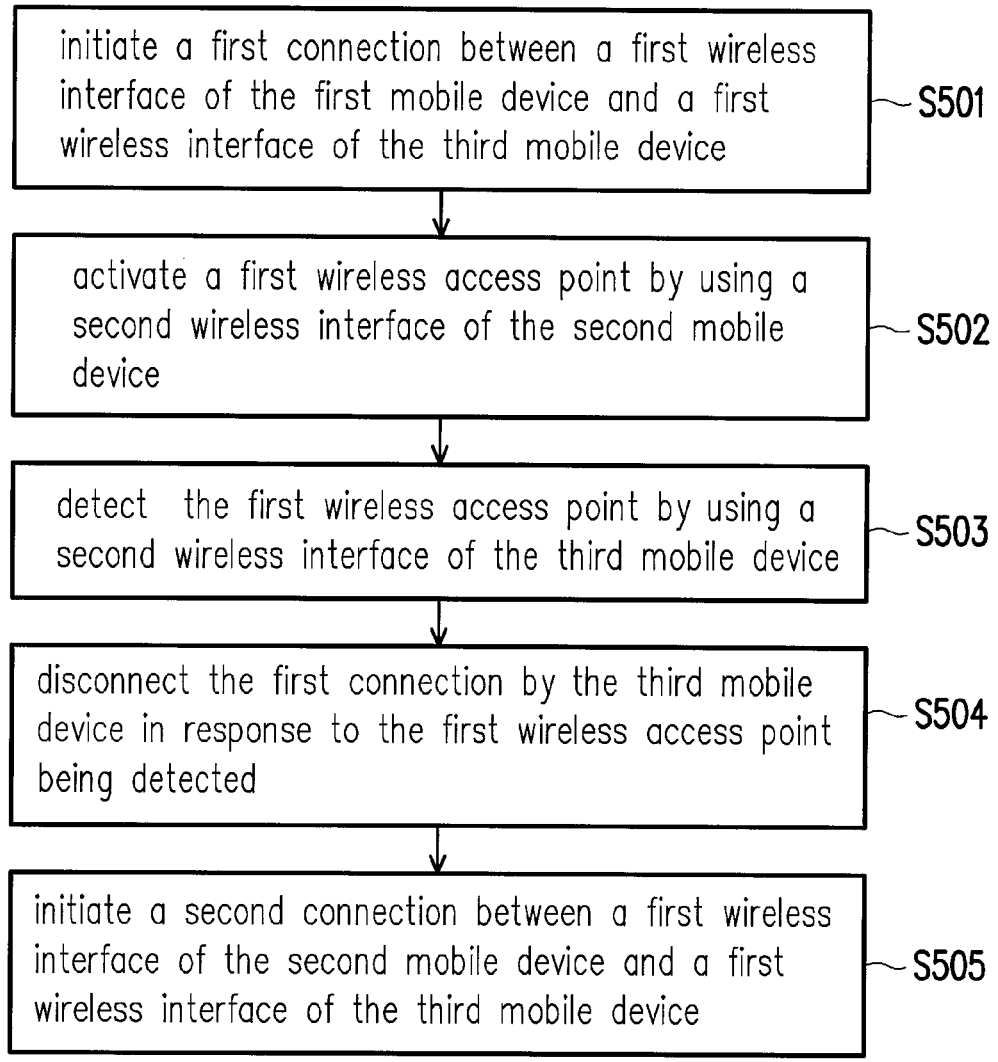
FIG. 5 illustrates a connection switching method from the perspective of a remote controllable system in accordance with one of the exemplary embodiments of the disclosure.
Figure 6:
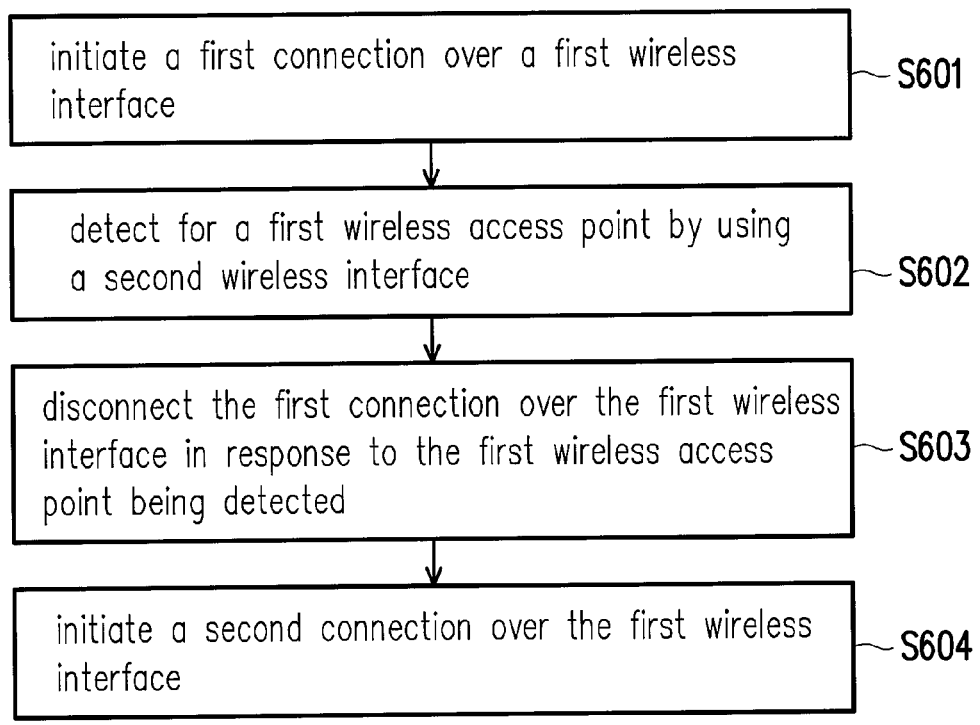
FIG. 6 illustrates a connection switching method from the perspective of a first mobile device in accordance with one of the exemplary embodiments of the disclosure.

FIG. 5 and FIG. 6 elucidate the aforementioned principles by respectively providing an exemplary embodiment from the perspective of a controllable system and an exemplary embodiment from the perspective of a mobile electronic device. FIG. 5 illustrates a connection switching method from the perspective of a remote controllable system that includes not limited to a first mobile device, a second mobile device, and a third mobile device which connects to either the first mobile device or the second mobile device in accordance with one of the exemplary embodiments of the disclosure. In step S501, a first connection between a first wireless interface of the first mobile device and a first wireless interface of the third mobile device could be initiated. In step S502, a first wireless access point would be activated by using a second wireless interface of the second mobile device. In step S503, the first wireless access point would be detected by using a second wireless interface of the third mobile device. In step S504, the first connection would be disconnected by the third mobile device in response to the first wireless access point being detected. In step S505, a second connection would be initiated between a first wireless interface of the second mobile device and a first wireless interface of the third mobile device.

In one of the exemplary embodiments, the first wireless interfaces of the first mobile device, the second mobile device, and the third mobile device are Bluetooth interfaces, the second wireless interfaces of the first mobile device, the second mobile device, and the third mobile device are Wi-Fi interfaces.

In one of the exemplary embodiments, the connection switching method may further include the second mobile device activating a second wireless access point by using the Wi-Fi interface of the second mobile device. The first wireless access point of the Wi-Fi interface would be used for performing the remote access function, and the second wireless access point of the Wi-Fi interface would be used for connecting to an internet.

In one of the exemplary embodiments, the connection switching method may further include the second mobile device performing a remote access function to control the third mobile device over the second connection. The remote access function may include the second mobile device controlling the third mobile device remotely through a Wi-Fi interface of the second mobile device, and the second mobile device obtaining a multimedia file from the third mobile device over the Wi-Fi interface.

In one of the exemplary embodiments, initiating the first connection may include the first mobile device initiating the first connection to the third mobile device by transmitting a discovery signal over the Bluetooth interface of the first mobile device and receiving an identification information and a password corresponding to the identification information over the Wi-Fi interface of the first mobile device.

In one of the exemplary embodiments, the third mobile device would detect the first wireless access point only when the first connection is not used for transmitting user data after a specific time period.

FIG. 6 illustrates a connection switching method from the perspective of a mobile device which connects to either a second mobile device or a third mobile device in accordance with one of the exemplary embodiments of the present disclosure. In step S601, the mobile device may initiate a first connection over a first wireless interface. In step S602, the mobile device may detect for a first wireless access point by using a second wireless interface. In step S603, the mobile device may disconnect the first connection over the first wireless interface in response to the first wireless access point being detected. In step S604, the mobile device may initiate a second connection over the first wireless interface.

In one of the exemplary embodiments, the mobile device detecting for the wireless access point by using the second wireless interface may include the mobile device detecting for the wireless access point only when the first connection is not transmitting user data over a specific time period.

In one of the exemplary embodiments, the mobile device detecting for the wireless access point by using the second wireless interface may further include in response to the first wireless access point of a second mobile device and a second wireless access point of a third mobile device being detected by the mobile device, the mobile device may initiate a third connection with either the second mobile device or the third mobile device based on whether the second mobile device or the third mobile device has remotely controlled the first mobile last.

In one of the exemplary embodiments, the first wireless interface of the mobile device is a Bluetooth interface and the second wireless interface of the second mobile device is a Wi-Fi interface.

In one of the exemplary embodiments, the mobile device receiving the initiation of the second connection over the Bluetooth interface in response to the wireless access point being detected may include the mobile device receiving a discovery signal over the Bluetooth interface in response the first wireless access point being detected and the mobile device transmitting an identification information and a password corresponding to the identification information over the Wi-Fi interface.

In one of the exemplary embodiments, the connection switching method may further include the mobile device establishing the third connection with either the second mobile device or the third mobile device and the mobile device receiving a remote access function over the second wireless interface.

In one of the exemplary embodiments, the mobile device receiving the remote access function over the second wireless interface may include receiving a control signal through the Wi-Fi interface of the mobile device and transmitting a multimedia file through the Wi-Fi interface of the mobile device.

In view of the aforementioned descriptions, the disclosure is suitable for being used for pear to pear wireless communication that involves connection switching between two or among multiple devices. The disclosure is able to facilitate connection switching between a mobile electronic device and a camera, in order to reduce their power consumptions, and to address the issue of having multiple mobile electronic devices attempting to remote control another mobile device.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of" multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A connection switching method that is applicable to a remote controllable system comprising a first mobile device a second mobile device, and a third mobile device which connects to the first mobile device or the second mobile device, the method comprising:
    initiating a first connection between a first wireless interface of the first mobile device and a first wireless interface of the third mobile device;
    activating a first wireless Wi-Fi access point by using a second wireless interface of the second mobile device;
    detecting the first wireless Wi-Fi access point by using a second wireless interface of the third mobile device;
    disconnecting the first connection by the third mobile device in response to the first wireless Wi-Fi access point being detected; and
    initiating a second connection between a first wireless interface of the second mobile device and a first wireless interface of the third mobile device.

2. The method of claim 1, wherein the first wireless interfaces of the first mobile device, the second mobile device, and the third mobile device are Bluetooth interfaces, the second wireless interfaces of the first mobile device, the second mobile device, and the third mobile device are Wi-Fi interfaces.

3. The method of claim 2 further comprising:
    activating a second wireless Wi-Fi access point by using the Wi-Fi interface of the second mobile device, wherein the first wireless Wi-Fi access point of the Wi-Fi interface is used for performing the remote access function, and the second wireless Wi-Fi access point of the Wi-Fi interface is used for connecting to an internet.

4. The method of claim 2 further comprising:
    establishing the second connection between the second mobile device and the third mobile device; and
    performing by the second mobile device a remote access function to control the third mobile device over the second connection.

5. The method of claim 2, wherein initiating the first connection comprising:
    initiating by the first mobile device the first connection to the third mobile device by transmitting a discovery signal over the Bluetooth interface of the first mobile device; and
    receiving an identification information and a password corresponding to the identification information over the Wi-Fi interface of the first mobile device.

6. The method of claim 1 further comprising:
    detecting the first wireless Wi-Fi access point by the third mobile device only when the first connection is not transmitting user data after a specific time period.

7. The method of claim 4, wherein performing by the second mobile device the remote access function comprising:
controlling the third mobile device remotely by the second mobile device through a Wi-Fi interface of the second mobile device; and
obtaining a multimedia file from the third mobile device over the Wi-Fi interface by the second mobile device.

8. A connection switching method applicable to a mobile device which connects to a second mobile device or a third mobile device, the method comprising:
initiating a first connection over a first wireless interface and detecting for a first wireless Wi-Fi access point by using a second wireless interface;
disconnecting the first connection over the first wireless interface in response to the first wireless Wi-Fi access point being detected; and
initiating a second connection over the first wireless interface.

9. The method of claim 8, wherein detecting for the first wireless Wi-Fi access point by using the second wireless interface comprising:
detecting for the first wireless Wi-Fi access point only when the first connection is not transmitting user data over a specific time period.

10. The method of claim 8, wherein detecting for the first wireless Wi-Fi access point by using the second wireless interface further comprising:
in response to the first wireless Wi-Fi access point of the second mobile device and a second wireless Wi-Fi access point of the third mobile device being detected, initiating a third connection with either the second mobile device or the third mobile device based on whether the second mobile device or the third mobile device has remotely controlled the mobile device last.

11. The method of claim 10, wherein the first wireless interface of the mobile device is a Bluetooth interface and the second wireless interface of the second mobile device is a Wi-Fi interface.

12. The method of claim 11, wherein receiving the initiation of the second connection over the Bluetooth interface in response to the first wireless Wi-Fi access point being detected comprising:
receiving a discovery signal over the Bluetooth interface in response the first wireless Wi-Fi access point being detected; and
transmitting an identification information and a password corresponding to the identification information over the Wi-Fi interface.

13. The method of claim 11 further comprising:
establishing the third connection with either the second mobile device or the third mobile device; and
receiving a remote access function over the second wireless interface.

14. The method of claim 13, wherein receiving the remote access function over the second wireless interface comprising:
receiving a control signal through the Wi-Fi interface of the mobile device and
transmitting a multimedia file through the Wi-Fi interface of the mobile device.

15. A remote controllable system comprising:
a first mobile device which comprises a first wireless interface and a second wireless interface;
a second mobile device which comprises a first wireless interface and a second wireless interface; and
a third mobile device which comprises a first wireless interface, a second wireless interface, wherein the remote controllable system is configured for:
initiating a first connection between the first wireless interface of the first mobile device and the first wireless interface of the third mobile device;
detecting a first wireless Wi-Fi access point by using the second wireless interface of the third mobile device;
disconnecting the first connection by the third mobile device in response to the first wireless Wi-Fi access point being detected; and
initiating a second connection between the first wireless interface of the second mobile device and the first wireless interface of the third mobile device.

16. The system of claim 15, wherein the first wireless interfaces of the first mobile device, the second mobile device, and the third mobile device are Bluetooth interfaces, and the second wireless interfaces of the first mobile device, the second mobile device, and the third mobile device are Wi-Fi interfaces.

17. The system of claim 15, wherein the system is configured for detecting the first wireless Wi-Fi access point by the third mobile device only when the first connection is not transmitting user data after a specific time period.

18. A first mobile device comprising:
a first wireless interface;
a second wireless interface; and
a processing unit coupled to the first wireless interface and the second wireless interface, wherein there processing unit is at least configured for:
initiating a first connection over the first wireless interface and detecting for a first wireless Wi-Fi access point by using the second wireless interface;
disconnecting the first connection over the first wireless interface in response to the first wireless Wi-Fi access point being detected; and
initiating a second connection over the first wireless interface.

19. The mobile device of claim 18, wherein the processing unit is configured at least to detect for the first wireless Wi-Fi access point by using the second wireless interface comprising:
detecting for the first wireless Wi-Fi access point only when the first connection is not transmitting user data over a specific time period.

20. The mobile device of claim 18, wherein the processing unit is configured at least for detecting for the first wireless Wi-Fi access point by using the second wireless interface further comprising:
in response to the first wireless Wi-Fi access point of a second wireless interface of the second mobile device and a second wireless Wi-Fi access point of a third mobile device being detected, establishing a third connection with either the second mobile device or the third mobile device based on whether the second mobile device or the third mobile device has remotely controlled the first mobile device last.

21. The mobile device of claim 20, wherein the first wireless interface of the first mobile device is a Bluetooth interface and the second wireless interface of the first mobile device is a Wi-Fi interface.

* * * * *